Nov. 7, 1961    G. B. ALEXANDER ET AL    3,007,878
AQUASOLS OF POSITIVELY-CHARGED COATED SILICA
PARTICLES AND THEIR PRODUCTION
Filed Nov. 1, 1956

INVENTORS
GUY B ALEXANDER,
GERARD HENDRIK BOLT
BY  *Fred C. Carlson*
ATTORNEY

United States Patent Office

3,007,878
Patented Nov. 7, 1961

3,007,878
AQUASOLS OF POSITIVELY-CHARGED COATED SILICA PARTICLES AND THEIR PRODUCTION
Guy B. Alexander, Brandywine Hundred, and Gerard Hendrik Bolt, Christiana Hundred, Del., assignors to E. I. du Pont de Nemours and Company, Wilmington, Del., a corporation of Delaware
Filed Nov. 1, 1956, Ser. No. 619,794
15 Claims. (Cl. 252—313)

This invention relates to aquasols of colloidal, positively charged particles and to processes for making them, and is more particularly directed to aquasols comprising positively charged particles consisting of a dense silica core coated with a polyvalent metal-oxygen compound of the class consisting of metal oxides, metal hydroxides, and hydrated metal oxides, the metal in each case having a valence of 3 to 4, the weight percent of particles in the sol being from 5 to $$\left(75 - 0.22\frac{B}{K}\right)$$

where K is the density of the coated particles in grams per cc. and B is the surface area of the coated particles in square meters per gram and is within the range of $$\left(\frac{44}{K} \text{ to } \frac{1300}{K}\right)$$

the sol also containing a monovalent, anionic counter ion, and the anion:polyvalent metal atom quotient, calculated by dividing the total mols of anions in the sol in excess of the total mols of cations in the sol other than cations of types in the coating and core by the total mols of polyvalent metal atoms of types in the coating, being less than $(X-2)$, where X is the valence of the polyvalent metal in the coating, and the invention being further particularly directed to the step in a process for making such sols comprising mixing an aquasol of colloidal, dense silica particles having a surface area of from 20 to 600 square meters per gram, with an aqueous solution of a basic salt of a metal having a valence of 3 to 4 and having a monovalent anion other than hydroxyl ion, the mol ratio of said monovalent anion to metal atoms in the salt being less than $(X-2):1$ where X is the valence of said metal, and the proportion of said basic salt present being such that the mol ratio of metal atoms in the salt to silica in the aquasol is from $2 \times 10^{-5}A:1$ to $2 \times 10^{-3}A:1$ where A is the surface area of the particles in the aquasol, in square meters per gram, whereby a coating of the polyvalent metal-oxygen compound is formed upon the silica particles and a stable aquasol of the coated particles is produced.

Figure 1:
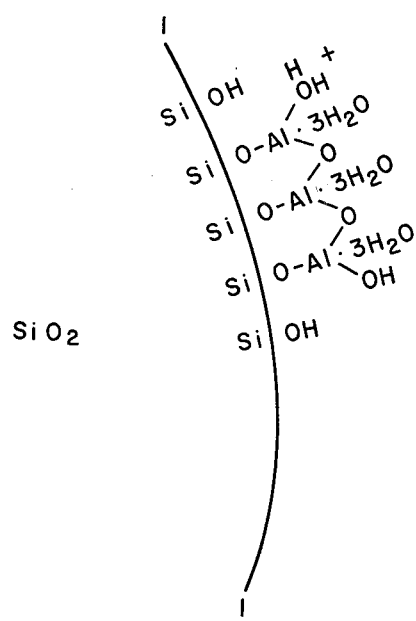
Figure 2:
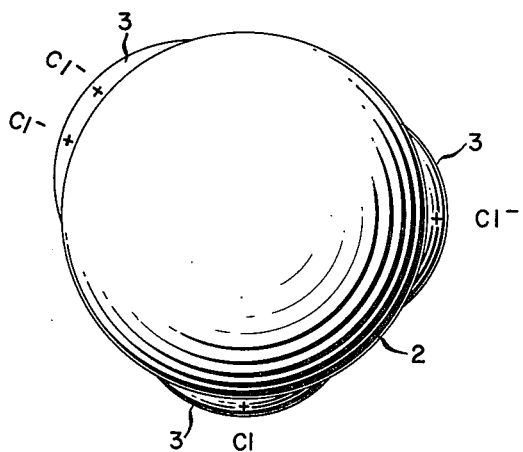

In the drawing,
FIGURE 1 illustrates the arrangement of atoms in a coating of an aluminum-oxygen compound upon a surface containing silanol groups representative of the surface of particles in a silica sol, the coating being of the type applied according to a process of the invention, and FIGURE 2 illustrates a typical particle representative of particles in an aquasol of positively charged particles of the invention, showing a silica core, a partial coating of an aluminum-oxygen compound, and a chloride counter ion disposed outside of the particle.

Silica aquasols which are stable at relatively high concentrations are now readily available, being made by processes as described, for instance, in Bechtold and Snyder U.S. Patent 2,574,902, Rule U.S. Patent 2,577,485, and White U.S. Patent 2,285,477. Ordinarily these sols are stabilized by the presence of a small amount of alkali such as sodium hydroxide. Thus in a typical sol of the prior art the ratio of total silica as $SiO_2$ to total alkali as $Na_2O$ may be in the range of, say, 60:1 to 130:1.

The silica particles in sols hitherto available are negatively charged. In a stable sol this negative charge is of sufficient density to prevent the silica particles from coming close enough together to coalesce and form a silica gel. While the negative charge has heretofore been considered essential to the stability of silica sols, it leads to a restriction on the utility of the sol products, namely—they are not compatible with sols of positively charged particles and when mixed with such sols they gel or precipitate.

In alumina and titania sols, for instance, the particles are positively charged. In situations where it is desired to use an alumina or titania sol in admixture with a silica sol it is found that the mixture gels so rapidly that practical use is precluded, especially at concentrations of silica above 5%. It will be seen that the utility of sols of the positively charged alumina and titania particles, as well as of the negatively charged silica particles could be extended if means were available for making the two types of particles compatible.

The present invention provides such means. According to the invention it has been found that if an aquasol of colloidal, dense silica particles having a surface area of 20 to 600 square meters per gram is mixed with an aqueous solution of a basic salt of a metal having a valence of 3 to 4, having a monovalent anion other than hydroxyl ion, and having a mol ratio of said monovalent anion to metal atoms in the salt of less than $(X-2):1$ where X is the valence of the metal, and the proportion of the basic salt mixed with the sol is such that the mol ratio of metal atoms in the salt to silica in the aquasol is from $2 \times 10^{-5}A:1$ to $2 \times 10^{-3}A:1$ where A is the surface area, in square meters per gram, of the particles in the aquasol, there is formed upon the silica particles a coating of an oxygen compound of the polyvalent metal, and a stable aquasol of the coated silica particles, in which the particles are positively charged, is formed.

The novel sols, which are compatible with sols of other positively charged particles such as alumina, titania, zirconia and thoria, are characterized by containing positively charged particles consisting of a dense silica core coated with a polyvalent metal-oxygen compound of the class consisting of metal oxides, metal hydroxides, and hydrated metal oxides, the metal in each case having a valence of 3 to 4. The sol products can be dilute or concentrated; the weight percent of particles in the sol can be from 5 to $$\left(75 - 0.22\frac{B}{K}\right)$$

where K is the density of the coated particles in grams per cc., and B is the surface area of the coated particles in square meters per gram and is within the range of $$\left(\frac{44}{K} \text{ to } \frac{1300}{K}\right)$$

The sol products also contain a monovalent, anionic counter ion other than hydroxyl. The proportion of stabilizing anion to polyvalent metal atoms in the sol products, when expressed as the quotient obtained by dividing the total mols of anions in the sol in excess of the total mols of cations in the sol other than cations of types in the coating and core by the total mols of polyvalent metal atoms of types in the coating, is less than $(X-2)$, where X is the valence of the polyvalent metal in the coating.

To make a composition of the invention one starts with an aquasol of colloidal, dense silica particles, such as a product of the Bechtold and Snyder, Rule, or White patents mentioned above or various other silica sols known to the art. These include sols made according to Alexander U.S. Patent 2,750,345; Marshall U.S. Patent 2,515,960; or Trail U.S. Patent 2,573,743.

The silica particles should be in the colloidal size range, being neither so large that settle out rapidly nor so small that the sols have the properties of true solutions. Ideally the particles are substantially discrete, but they can consist of a plurality, such as doublets or triplets, of ultimate particles, provided the plural particles have the nature of a single particle rather than the character of an aggregated gel mass. The former type does not, for instance, greatly increase the relative viscosity of the sol, whereas aggregation of the latter type does substantially raise the relative viscosity.

With sols of dense, substantially discrete particles the specific surface area, as determined by nitrogen adsorption is inversely proportional to average particle diameters. The silica sols employed as starting materials in processes of this invention have a surface area of from 20 to 600 square meters per gram; for discrete, dense, substantially spherical particles this corresponds to particles from 150 down to 5 millimicrons in diameter.

If the silica particles are dense, rather than porous, so that nitrogen adsorption within the particles is negligible, the specific surface area as determined by nitrogen adsorption is not greatly in excess of the specific surface area as calculated from direct observation of the particles in an electron-micrograph—usually not more than about 20% greater. It is preferred to use as the starting material a sol in which this difference does not exceed about 20%.

The silica sol selected ordinarily will be stabilized with a small amount of an alkali such as sodium hydroxide, and often will contain minor amounts of anions other than hydroxyls, as impurities. The amount and nature of ions from these sources should be known because they are taken into account in calculating proportions as hereinafter described. The use of a silica sol having an $SiO_2$:alkali oxide mol ratio of from $$\left(\frac{10^6}{A}\right):1 \text{ to } \left(\frac{4 \times 10^4}{A}\right):1$$

where A is the specific surface area of the silica particles in square meters per gram, is especially preferred.

The basic salt solution to mix with a silica sol in a process of this invention is an aqueous solution of a salt of a metal having a valency of 3 to 4—that is, a tri- or tetravalent metal. Thus, the trivalent metal in the salt can be aluminum, chromium, gallium, indium, or thallium, and the tetravalent metal can be titanium, germanium, zirconium, stannic tin, cerium, hafnium, and thorium. Preferred metals include aluminum, zirconium, and thorium.

The anions in the polyvalent metal salt, other than hydroxyl ions, are so selected as to make the salt soluble in water. It will be understood that when reference is made herein to the fact that the salt has a monovalent anion other than hydroxyl, the intention is not to exclude hydroxyl from the salt but to indicate that another anion is present in addition to the hydroxyl which the salt contains. Thus all basic salts are included, provided they are water-soluble and can produce the required ionic relationships as hereinafter described.

The anion, other than hydroxyl, can be any stable, monovalent anion which does not destabilize the system. For instance, the permanganate ion is unstable and hence is not preferred. Similarly fluoride ions are well known to have a destabilizing effect on silica sols and are avoided for this reason. Anions of weak acids such as formate, acetate, lactate, and the like can be used if they form a soluble salt of the tri- or tetravalent metal. Often this is not the case, however. Especially preferred are anions of strong acids, including chloride, nitrate, bromide, perchlorate, bromate, and trichloroacetate.

The preferred salts, therefore, are the chlorides and nitrates, including basic chlorides and nitrates, of aluminum, zirconium, and thorium.

The mol ratio of monovalent anion to polyvalent metal atoms in the salt is important, and should be less than $(X-2):1$, where X is the valence of the metal. Thus, for trivalent metals such as aluminum, X is 3 and the ratio is 1:1, meaning that there should be not more than 1 monovalent anion, other than hydroxyl, for each aluminum atom. If the anion being used is the chloride, for example, one would therefore use the basic aluminum chloride having the proportion $Al:Cl:(OH)_2$, and not $Al:Cl_2:(OH)$. For instance, a basic aluminum chloride having the empirical formula $Al(OH)_5Cl$, is especially preferred. The basic metal salt must be water soluble, and this requires that some anion other than hydroxyl be present. Salts which contain an anion to metal atom ratio of $(X-2):4$ have about the lower limit which satisfies this condition, and hence a ratio in the range from $(X-2):1$ to $(X-2):4$ is preferred. This range applies to the process only, and is not a limitation on the final product.

On the other hand, if the polyvalent metal is tetravalent, $(X-2)$ becomes 2, and two atoms of the anion can be present for each atom of metal. Thus, with thorium as the metal and nitrate as the cation other than hydroxyl, one could have as many as two nitrate ions per thorium.

It will be understood that in the basic salts here involved polymerization can occur, so that the valences of the polyvalent metal, other than those satisfied by the anion other than hydroxyl, can be linked to adjacent polyvalent metal atoms through oxygen, and hence need not necessarily be satisfied by hydroxyls. How such remaining valences are combined is of minor concern; what is important is that the anion, other than hydroxyl, to metal atom ratio be limited as above-indicated.

The processes of the present invention are carried out by mixing a silica sol and a basic polyvalent metal salt solution, each component being selected as above described. During the mixing the charge on the silica particles in the sol is reversed, producing a momentary condition of minimum stability. Hence it is preferred to effect mixing under such vigorous agitation that homogeneity is achieved substantially instantaneously. Feeding the silica sol and the basic salt solution into separate intakes of a high-speed centrifugal pump is a practical and effective way to accomplish such instantaneous mixing.

The proportion of basic metal salt to silica particles in the sol mixture is critical, and must be properly controlled. This proportion is related to the surface area, A, expressed as square meters per gram, of the silica particles, in the aquasol. The proportion of basic metal salt mixed with the silica aquasol is such that the mol ratio of metal atoms in the salt to silica in the aquasol is from $2 \times 10^{-5}A:1$ to $2 \times 10^{-3}A:1$. It can be shown that $2 \times 10^{-5}A:1$ represents a surface coverage of about 2.4 mol percent, i.e., enough basic metal salt is added to correspond mol wise to 2.4% of the silicon atoms on the surface of the particles. For instance, if the surface area of the particles in the sol is 200 square meters per gram, and the metal salt is basic aluminum chloride, the mol ratio of aluminum atoms to silica in the aquasol is controlled within the range of from 0.004:1 to 0.4:1; in other words, from .004 to 0.4 mols of aluminum are added for each mol of silica present. An especially preferred range for this ratio is from $(10^{-4})A:1$ to $8 \times 10^{-4}A:1$. Less basic metal salt than $2 \times 10^{-5}A:1$ is insufficient to produce the positive charge necessary for stabilization. Whereas a ratio of more than $2 \times 10^{-3}A:1$ could be used, provided most of the excess polyvalent metal atom is caused to accrete on the surface of the particles, this ordinarily has no advantage.

It will be apparent that the concentration of salt solution added is unimportant insofar as the above-mentioned ratio is concerned. Since it is ordinarily desired to produce a relatively concentrated sol product, a relatively concentrated salt solution is usually employed;

however, the sol product can be concentrated by evaporation of water if desired. In some circumstances excessive dilution of the basic salt solution causes an undesirable degree of hydrolysis and polymerization and is for this reason avoided.

To achieve maximum stability in the sol product the mixing step is followed by removal of excess electrolyte, as by dialysis. The sols so purified can then be concentrated to the maximum concentrations herein indicated.

By the processes of this invention above-described there is deposited upon the silica particles in the original aquasol a coating of an oxygen compound of the polyvalent metal added to the sol as basic salt. This oxygen compound is of the class consisting of the oxides, hydroxides and hydrated oxides of the polyvalent metal.

In FIGURE 1 of the drawing the curved line 1—1 represents a segment of the surface of a dense silica particle such as is present in the original silica aquasol. It will be seen that the surface contains silicon atoms (Si). These are, of course, linked together through oxygen—that is, by siloxane (Si—O—Si) bridges, not shown. Some of the silicon atoms are combined with hydroxyl radicals as silanol (—SiOH) groups. Other silanol groups have reacted with a basic aluminum salt according to a process of the invention to produce a chemically combined coating of hydrated aluminum oxide. It will be noted that each aluminum atom has at least two of its valences directly or indirectly linked to surface silicon atoms through oxygen.

In FIGURE 2, a silica core 2 is shown bearing a partial coat 3, of an aluminum-oxygen compound deposited by treatment with basic aluminum chloride according to the invention. The coating is shown as having a positive charge, +. The positive charge is balanced by chloride counter ions, Cl⁻, outside of, but adjacent to, the coating. The coated particles are, of course, dispersed in the continuous, aqueous phase of the sol, not shown.

Except as just indicated, the silica core of the positively charged particle is the silica particle as it existed in the original silica sol. It is dense, substantially discrete, and has the other characteristics above-mentioned for the silica particles in the silica sol.

The coating is an oxide, hydroxide, or hydrated oxide of a metal of valence 3 or 4. The metals enumerated as suitable in the basic salt used in the processes above-described are all suitable as the polyvalent metal in the coating, with the same preferences. Thus, the preferred metals are aluminum, zirconium, and thorium.

The concentration of positively charged particles which can be present in a stable sol product of this invention is related to the specific surface area of the particles and also to their density. The sols can contain from $$5 \text{ to } \left(75 - 0.22 \frac{B}{K}\right) \text{ percent by weight}$$

where K is the density of the coated particles in grams per cubic centimeter and B is the surface area in square meters per gram and is within the range of $$\frac{44}{K} \text{ to } \frac{1300}{K}$$

Thus, for example, if the density of the coated particles, K, is 2.2 grams per cc. and the surface area of the particles, B, is 200 square meters per gram ($m.^2/g.$), the sol can have a maximum weight concentration of $$\left(75 - \frac{0.22 \times 200}{2.2}\right) \text{ or } 55\%$$

The minimum concentration of the sol is, of course, 5%. A surface area of 200 is, of course, within the range of $$\frac{44}{2.2} \text{ to } \frac{1300}{2.2} \text{ or } 20 \text{ to } 591$$

The surface area of the particles in the sol product can be measured by any applicable method, of which several are well known. One suitable method is by nitrogen adsorption. It will be observed that the specific surface area decreases as the metal-oxygen coating builds up, and this is particularly true when the metal is a heavy metal such as thorium.

In the sol product there is a monovalent, anionic counter ion outside the coated particles. The amount of it present corresponds to the change of the coating. Its charge counterbalances the positive charge on the coated particle so as to leave the over-all sol neutral. It will be understood that the counter ion is not rigidly positioned in relation to a particular particle but, rather, is in equilibrium, for instance with similar ions from excess, unreacted treating salt in the solution, and can and does migrate away from the particle if replaced by another ion of like type.

The positive charge density and the degree of metal-oxygen compound coating of the silica particles are important factors in establishing the stability of the sol products of this invention. For defining the positive charge density and the degree of coating it should be kept in mind that the amount of coating present on the surface is a function of the concentration of metal compounds of low-molecular weight present in solution in equilibrium with the coating, and also of the pH of the system. For this reason the total amount of polyvalent metal oxide in the system is not necessarily equal to the amount of coating. Furthermore, the charge density per mole of surface coating is determined by the concentration of the potential-determining ion, in this case, the pH of the system. The actual determination of both charge density and the degree of coating involves equilibration of the sol with a dialysate and the determination of the concentration of both the metal oxide and the counter ion in the sol and the dialysate. The excess of metal oxide and counter ion in the sol over that in the dialysate defines the degree of coating and the charge density, respectively.

A factor which is definitive of sol products of this invention and correlates the considerations just mentioned is herein designated as the anion:polyvalent metal atom quotient. To calculate this quotient, one first determines the total mols of anions in the sol. From this is subtracted the total mols of cation in the sol other than cations of types in the coating and core—that is, other than polyvalent metal cations of valence 3 to 4 present in the core and coating. The difference or remainder, divided by the total mols of polyvalent metal atoms of types in the coating gives the stabilizing ion:polyvalent metal quotient, which should be less than ($X-2$), where X is the valence of the polyvalent metal in the coating. Thus, if the metal is aluminum or another trivalent atom, the quotient should be less than 1, and if the metal is thorium or another tetravalent metal atom, the quotient should be less than 2.

The total of all anions in the sol includes the counter-ions, the anions of foreign salts, and anions of the basic polyvalent metal salt in solution but not associated with the particle as counter ions. The total of all cations in the sol other than cations of types in the coating and core includes hydrogen ions and the cations coming in from foreign salts and from the base used to stabilize the silica sol. Generally these cations are monovalent or divalent, since cations of valence 3 or 4 would be associated with the particle coating.

In a preferred sol product of the invention the quotient above-mentioned ranges from ($X-2$) down to $$(X-2)10^{-2}$$

As stated above, the sol products of this invention are unique in that they contain silica particles carrying a positive, rather than a negative, charge. They are compatible with, and form stable colloids when mixed with other positively charged particles. For instance they form stable mixtures with sols of colloidal zirconia, colloidal titania, and colloidal alumina. Such novel mixed sols represent an important aspect of this invention.

Colloidal zirconia sols which are excellent for admixing with these products of the present case are described in United States patent application Serial No. 566,969, filed February 21, 1956 by Alexander and Bugosh, now abandoned. Mixtures containing at least 10% solids, of which 50% is $SiO_2$ and 50% is $ZrO_2$, on a mol basis, are especially preferred, since these can be dried and fired to yield $ZrSiO_4$, zircon. Mixtures containing more than 50% $ZrO_2$, i.e., 50 to 99% $ZrO_2$, are also specifically preferred. These mixed sols are especially useful as a binder for zircon, since on the addition to zircon grain, drying and firing, zircon binder is formed in situ. Moreover, because of the low sintering and fusing temperature of the colloidal particles, this binder can be applied at a much lower temperature than is the case with zircon binders prepared from macroscopic particles. Silica-zirconia sols should contain at least 10% solids, should have a pH in the range of 3 to 6.5, and should be relatively free of electrolytes, other than stabilizer.

Mixtures of titania and silica colloidal particles, in the form of aquasols and dried-down films, are an especially preferred species. Particularly preferred are sols containing in the solids fraction 5 to 15% $TiO_2$ and 95 to 85% $SiO_2$. The product sol mixture should contain at least 10% solids, and is preferably in the range of $$20\% \text{ to } \left(75 - 0.22\frac{B}{K}\right)\%$$

solids, where B is the surface area of the solids in m.$^2$/g., and K is the average density of the particles in g./ml. Especially preferred are sols containing 10% $TiO_2$ and 90% $SiO_2$ since this represents a mixture which when dried and fired will fuse at a minimum temperature. Titania sols can be prepared according to techniques with which the art is already familiar, as for example, see Weiser, "Inorganic Colloid Chemistry," Vol. II, J. Wiley and Sons, 1935, pp. 261–2. Concentrated $TiO_2$ sols, having at least 30–50% solids and having a low relative viscosity are preferred. These should be substantially free of electrolyte and have a pH in the range of 3 to 6.5. Sols containing a mixture of $SiO_2$ and $TiO_2$ particles can be used as a binder in ceramic coatings.

Mixtures can also be prepared using the positively charged product of this invention with aquasols of alumina.

Compositions of this invention are useful as coating agents, particularly for negatively charged surfaces, like glass.

The invention will be better understood by reference to the following illustrative examples:

Example 1

A silica sol ("Ludox" LS colloidal silica) containing 30% $SiO_2$ by weight, the silica particles having a specific surface area of about 210 m.$^2$/g. of $SiO_2$, as determined by nitrogen adsorption, and containing an amount of stabilizing alkali corresponding to an $SiO_2$:$Na_2O$ ratio of about 300, and a solution of basic aluminum chloride, containing 1 mole of Al and ½ mole Cl per liter, were mixed by feeding both liquid solutions at equal rates into a centrifugal pump equipped with two inlets. The resulting product was a stable sol, containing about 16% $SiO_2$, 2.5% $Al_2O_3$, 0.9% Cl, corresponding to a mole ratio of Cl:Al equal to about 1:2, and a ratio of Al to surface silica groups of 1:1. The pH of this sol, as measured by conventional electrometric means was 4.2.

Example 2

One thousand ml. of the silica sol described in Example 1 was mixed into 500 ml. of a solution of basic aluminum chloride, containing ½ mole of Al and ¼ mole of chloride, by means of a Waring Blendor. The resulting clear and stable sol contained 21.2% $SiO_2$, 1.7% $Al_2O_3$, and 0.6% Cl, corresponding to a mole ratio of Cl:Al equal to about 1:2, and a ratio of Al to surface silica groups of 1:2. The pH of this sol was 4.3, the specific conductance was $1000 \times 10^{-5}$ mho cm.$^{-1}$ at 25° C.

A portion of this sol was dialyzed against a continuous stream of distilled water until the specific conductance had decreased to $57 \times 10^{-5}$ mho cm.$^{-1}$; the pH was 4.3. Analysis of this dialyzed sol indicated it to contain 11.4% $SiO_2$, 0.44% $Al_2O_3$ and 0.058% Cl, corresponding to a mole ratio of Cl:Al=1:5.3, and a ratio of Al to surface silica groups of 1:3.7.

The determination of the total anion (i.e., Cl) concentration of the sol in excess over the total anion (i.e., Cl) concentration in an equilibrium dialysate indicated that the surface charge of the colloid corresponded to 0.03 milliequivalents per surface silica group, or 0.12 milliequivalents per surface Al group.

A portion of the dialyzed sol was concentrated by boiling under vacuum at 35° C. The resulting sol contained 24.25% $SiO_2$, 0.93% $Al_2O_3$, and 0.12% Cl, and appeared stable although it was somewhat viscous.

Example 3

Sixty ml. of a sol containing silica particles with a specific surface of 24 m.$^2$/g., and a total $SiO_2$ concentration of 33%, and having a pH of 9.2, was mixed into 20 ml. of a basic aluminum chloride solution, containing 7.8 m.mol of Al and 3.9 m.mol of Cl, by means of a Waring Blendor.

The resulting stable sol contained 23% $SiO_2$, 0.43% $Al_2O_3$ and 0.15% Cl, corresponding to a mole ratio of Cl:Al equal to 1:2, and a ratio of Al to surface silica groups of 1:1.

Example 4

Twenty-five ml. of the silica sol described in Example 3 was mixed into 10 ml. of a basic ziraconium chloride solution containing 1.25 m.mol Zr and about 0.75 m.mole Cl, by means of a Waring Blendor. The resulting stable sol contained 24% $SiO_2$, 0.38% $ZrO_2$, and 0.065% Cl, corresponding to a mole ratio of Cl:Zr equal to 1:1.7 and a ratio of Zr to surface silica groups of 1:2.5. The pH of this sol, as measured by conventional electrometric means, was 3.5.

Example 5

Thirty ml. of a silica sol described in Example 1 was mixed into 30 ml. of a basic ziraconium chloride solution containing 15 m.moles of Zr and about 9 m.moles of Cl, by means of a Waring Blendor. The resulting sol, although initially somewhat turbid, became very clear and stable after standing for 24 hours. This sol contained 16% $SiO_2$, 2.7% $ZrO_2$ and 0.47% Cl, corresponding to a mole ratio of Cl:Zr equal to 1:1.7 and a ratio of Zr to surface silica groups of 1:2.

Example 6

10.3 g. of the dialyzed aluminum coated sol described in Example 2, having a pH of 4.3, were mixed with 5 g. of a zirconia sol, containing 23.4% $ZrO_2$, having a ratio of Zr:Cl equal to 8, an $N_2$ surface area of 180 m.$^2$/g. of solids, and having a pH of 3.6. The resulting stable sol contained 7.6% $ZrO_2$, 7.6% $SiO_2$, and 0.3% $Al_2O_3$. The stability of this sol was very striking in comparison to the complete gelation which occurred when a similar mixture was prepared replacing the aluminum coated sol by an identical amount of a silica sol which was deionized to pH 4.2.

Example 7

10.8 g. of the dialyzed aluminum coated sol described in Example 2 were mixed with 0.57 g. of a titania sol, containing 25.1% $TiO_2$, having a $N_2$ area of 140 m.$^2$/g. of solids, and having a pH of 3.0. The resulting stable and transparent sol contained 1.2% $TiO_2$, 10.9% $SiO_2$, and 0.4% $Al_2O_3$. In contrast to the above mixture, a similar preparation containing the deionized silica sol as described in Example 6 flocculated completely.

Example 8

1.25 g. of the dialyzed aluminum coated sol described in Example 2 were mixed with 14.9 g. of an alumina sol, containing 2.86% $Al_2O_3$, 0.5% acetic acid, having a $N_2$ surface area of 270 m.$^2$/g., the ratio of length:diameter of the fibers being about 500, and having a pH of 4.2. The resultant sol was clear (though somewhat viscous) as opposed to a similar mixture in which the aluminum coated silica sol was replaced by deionized "Ludox" silica sol of pH 4.2, which mixture became very turbid and which precipitated.

Example 9

A 1 molar solution of basic thorium nitrate was prepared by dissolving 150 m.mol thorium hydroxide in 50 m.mol of thorium nitrate, and diluting with distilled water to 200 ml. The resulting solution had a ratio of Th:$NO_3$ equal to 1:1. Fifteen ml. of the "Ludox" sol described in Example 1 was mixed into 15 ml. of the basic thorium nitrate solution in a Waring Blendor. The resulting sol was clear and stable, containing about 16% $SiO_2$, 13.2% $ThO_2$, and 0.8% $NO_3$, corresponding to a mole ratio of $NO_3$:Th equal to 1:1, and a ratio of Th to surface silica groups of 1:1.

Example 10

100 g. of a sol containing silica particles with a specific surface area of 24 m.$^2$/g. and a total $SiO_2$ concentration of 64%, and having a pH of 8, was mixed into 25 ml. of a basic aluminum chloride solution, containing 25 m.mol of Al and 12.5 m.mol of Cl, by means of a Waring Blendor.

The resulting stable sol contained 50% $SiO_2$, 1% $Al_2O_3$ and 0.35% Cl, corresponding to a mole ratio of Cl:Al equal to about 1:2, and a ratio of Al to surface silica groups of about 1.2:1.

We claim:

1. A stable aquasol of positively charged particles consisting of a dense silica core coated with a polyvalent metal-oxygen compound of the class consisting of metal oxides, metal hydroxides, and hydrated metal oxides, the metal being selected from the group consisting of trivalent aluminum, chromium, gallium, indium, and thallium, and tetravalent titanium, germanium, zirconium, tin, cerium, hafnium, and thorium, the weight percent of particles in the sol being from 5 to $$\left(75 - 0.22\frac{B}{K}\right)$$

where K is the density of the coated particles in grams per cc. and B is the surface area of the particles in square meters per gram and is within the range of $$\frac{44}{K} \text{ to } \frac{1300}{K}$$

the sol also containing a monovalent, anionic counter ion, and the counter ion:polyvalent metal atom quotient, calculated by dividing the total mols of anions in the sol in excess of the total mols of cations in the sol other than cations of types in the coating and core by the total mols of polyvalent metal atoms of types in the coating, being less than $X-2$, where X is the valence of the polyvalent metal in the coating.

2. The stable aquasol of claim 1 in which the counter ion:polyvalent metal atom quotient is from $(X-2)10^{-2}$ to $(X-2)$.

3. The stable aquasol of claim 1 substantially free of foreign salts.

4. The stable aquasol of claim 1 in admixture with an aquasol of colloidal, positively charged particles of a metal oxide selected from the group consisting of alumina, titania, zirconia, and thorea, the mol ratio of $SiO_2$ to other metal oxide being in the range from 1:100 to 500:1 and the total solids content of the aquasol being at least 10% by weight.

5. The stable aquasol of claim 1 in admixture with an aquasol of colloidal, positively charged particles of titania, the mol ratio of $SiO_2$ to titania being the range from 1:100 to 500:1 and the total solids content of the aquasol being at least 10% by weight.

6. The stable aquasol of claim 1 in admixture with an aquasol of colloidal, positively charged particles of titania, the mol ratio of $SiO_2$ to titania being in the range from 20:1 to 4:1 and the total solids content of the aquasol being at least 10% by weight.

7. The stable aquasol of claim 1 in admixture with an aquasol of colloidal, positively charged particles of zirconia, the mol ratio of $SiO_2$ to zirconia being in the range from 1:100 to 500:1 and the total solids content of the aquasol being at least 10% by weight.

8. The stable aquasol of claim 1 in admixture with an aquasol of colloidal, positively charged particles of alumina, the mol ratio of $SiO_2$ to alumina being in the range from 1:100 to 500:1 and the total solids content of the aquasol being at least 10% by weight.

9. A stable aquasol of positively charged particles consisting of a dense silica core coated with hydrated aluminum oxide, the weight percent of particles in the sol being from 5 to $$\left(75 - 0.22\frac{B}{K}\right)$$

where K is the density of the coated particles in grams per cc. and B is the surface area of the coated particles in square meters per gram and is within the range of $$\frac{44}{K} \text{ to } \frac{1300}{K}$$

the sol also containing a monovalent, anionic counter ion selected from the group consisting of chloride, nitrate, bromide, perchlorate, bromate, and trichloroacetate ions, and the counter ion:aluminum atom quotient, calculated by dividing the total mols of anions in the sol in excess of the total mols of cations in the sol other than aluminum cations by the total mols of aluminum cations, being from .01 to 1.0.

10. A stable aquasol of positively charged particles consisting of a dense silica core coated with hydrated zirconium oxide, the weight percent of particles in the sol being from 5 to $$\left(75 - 0.22\frac{B}{K}\right)$$

where K is the density of the coated particles in grams per cc. and B is the surface area of the coated particles in square meters per gram and is within the range of $$\frac{44}{K} \text{ to } \frac{1300}{K}$$

the sol also containing a monovalent, anionic counter ion, and the counter ion:zirconium atom quotient, calculated by dividing the total mols of anions in the sol in excess of the total mols of cations in sol other than zirconium cations by the total mols of zirconium cations, being from .02 to 2.0.

11. The stable aquasol of claim 10 in admixture with an aquasol of colloidal, positively charged particles of zirconia, the mol ratio of silica to zirconia in the mixture being in the range of from 2:1 to 1:10 and the total solids content of the aquasol being at least 10% by weight.

12. In a process for making an aquasol of positively charged particles the step comprising mixing an aquasol of colloidal, dense silica particles having a surface area of 20 to 600 square meters per gram with an aqueous solution of a basic salt of a metal selected from the group consisting of trivalent aluminum, chromium, gallium, indium, and thallium, and tetravalent titanium, germanium, zirconium, tin, cerium, hafnium, and thorium and having a monovalent anion selected from the group consisting of chloride, nitrate, bromide, perchlorate, bromate, and trichloroacetate ions, the mol ratio of said monovalent anion to metal atoms in the salt being less than $(X-2):1$, where X is the valence of said metal, and the proportion of said basic salt present being such that the mol ratio of metal atoms in the salt to silica in the aquasol is from $2\times10^{-5}A:1$ to $2\times10^{-3}A:1$, where A is the surface area of the particles in the aquasol in square meters per gram, whereby a coating of a polyvalent metal-oxygen compound is formed upon the silica particles and a stable aquasol of the coated particles is produced.

13. A process of claim 12 in which the mol ratio of metal atoms in the salt to silica in the aquasol is from $10^{-4}A$ to $(8\times10^{-4})A$.

14. A process of claim 12 in which mixing is effected under agitation sufficiently vigorous to effect homogeneity substantially instantaneously.

15. In a process for making an aquasol of positively charged particles the steps comprising mixing an aquasol of colloidal, dense silica particles having a surface area of 20 to 600 square meters per gram with an aqueous solution of a basic salt of a metal selected from the group consisting of trivalent aluminum, chromium, gallium, indium, and thallium, and tetravalent titanium, germanium, zirconium, tin, cerium, hafnium, and thorium and having a monovalent anion selected from the group consisting of chloride, nitrate, bromide, perchlorate, bromate, and trichloroacetate ions, the mol ratio of said monovalent anion to metal atoms in the salt being less than $(X-2):1$, where X is the valence of said metal, and the proportion of said basic salt present being such that the mol ratio of metal atoms in the salt to silica in the aquasol is from $2\times10^{-5}A:1$ to $2\times10^{-3}A:1$, where A is the surface area of the particles in the aquasol in square meters per gram and dialyzing to remove dialyzable electrolytes, whereby a coating of a polyvalent metal-oxygen compound is formed upon the silica particles and a stable aquasol of the coated particles is produced.

References Cited in the file of this patent

UNITED STATES PATENTS

| | | |
|---|---|---|
| 1,896,055 | Patrick et al. | Jan. 31, 1933 |
| 2,657,183 | Bechtold | Oct. 27, 1953 |

OTHER REFERENCES

Hazel et al.: pp. 2256–7 in J. Am. Chem. Soc., vol. 71.

Iler: "The Colloid Chemistry of Silica and Silicates," Cornell University Press, Ithaca, N.Y., 1955, page 111.